No. 691,689.    Patented Jan. 21, 1902.
A. WOLLENSAK.
PHOTOGRAPHIC SHUTTER.
(Application filed Sept. 14, 1900.)
(Model.)  3 Sheets—Sheet 1.
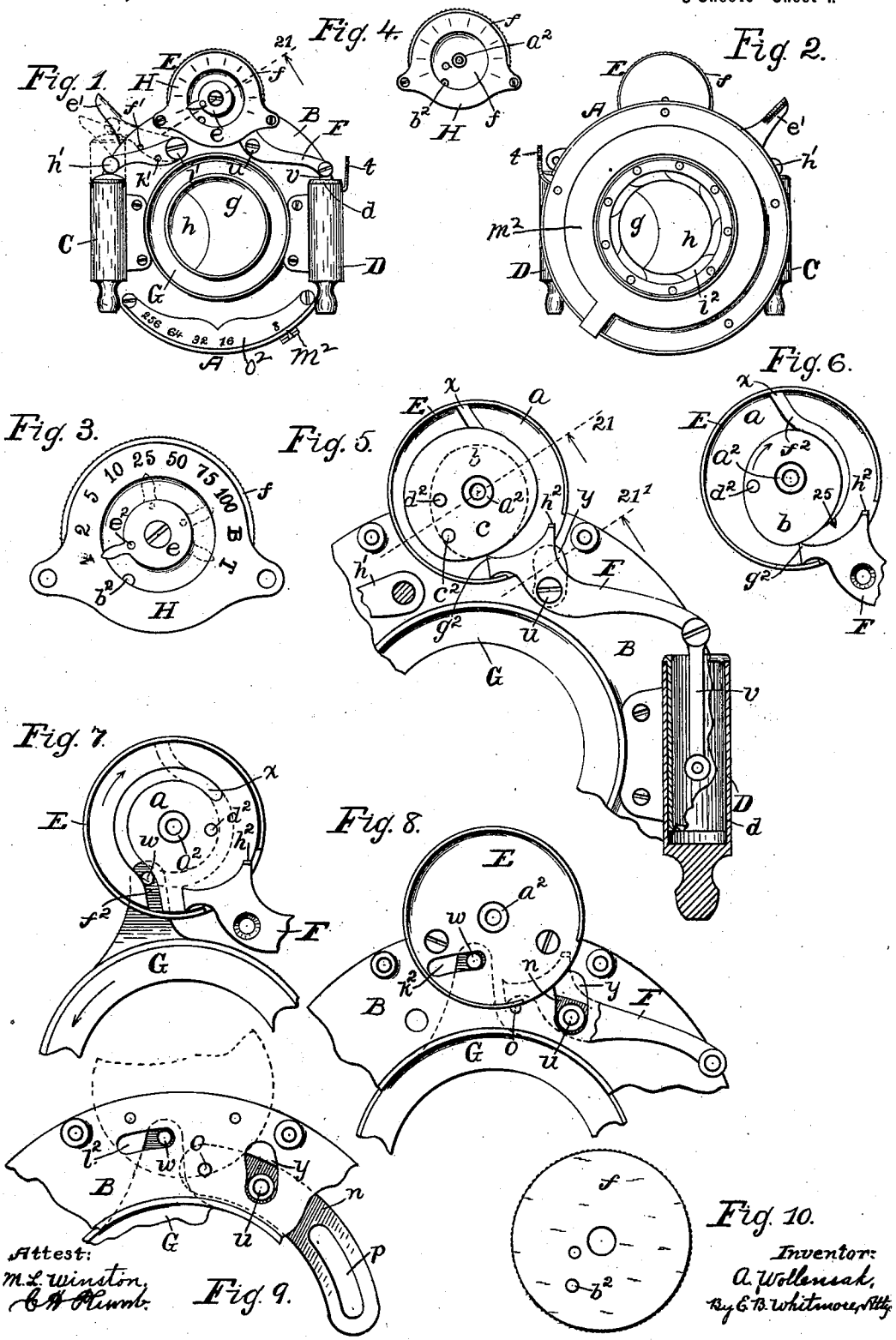

No. 691,689. Patented Jan. 21, 1902.
A. WOLLENSAK.
PHOTOGRAPHIC SHUTTER.
(Application filed Sept. 14, 1900.)
(Model.) 3 Sheets—Sheet 2.
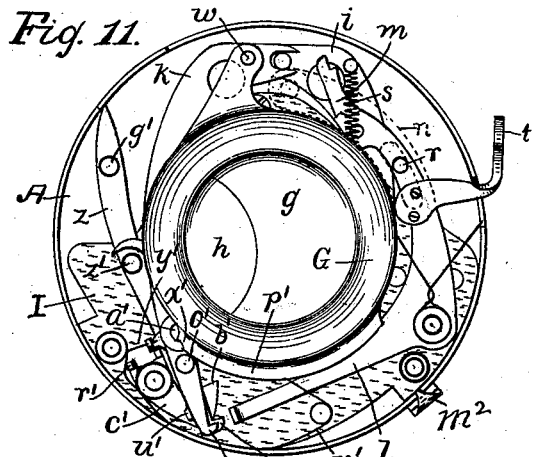
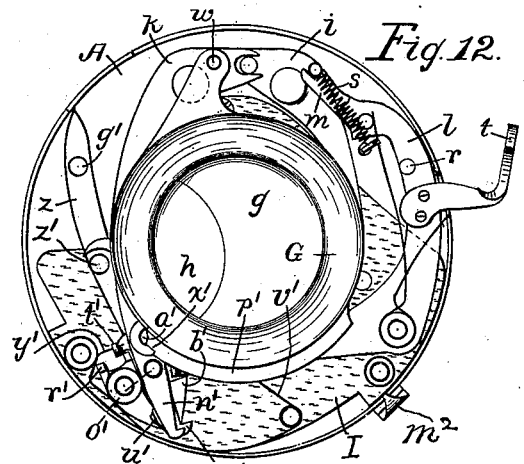
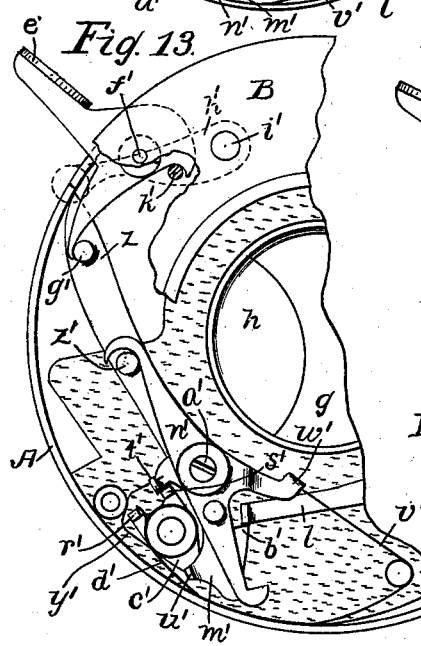
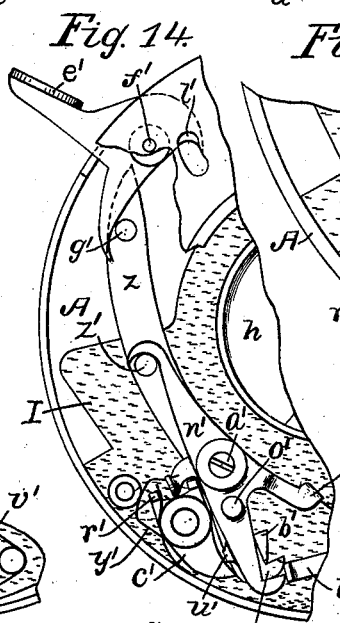
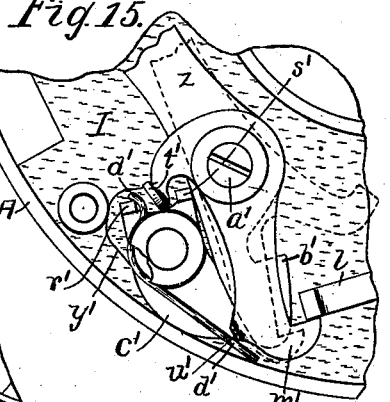
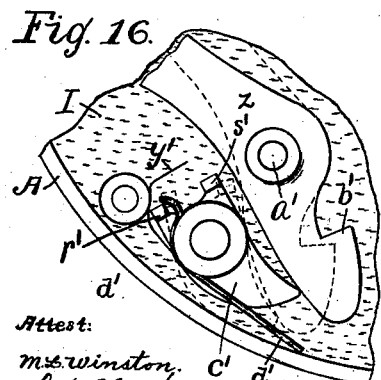
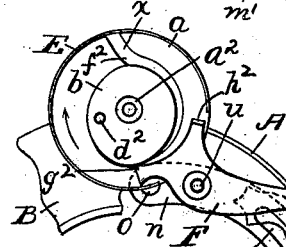
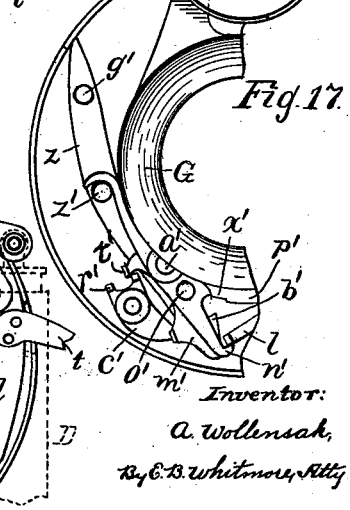
Attest:
M. E. Winston.
C. H. Klint.
Inventor:
A. Wollensak,
By E. B. Whitmore, Atty.

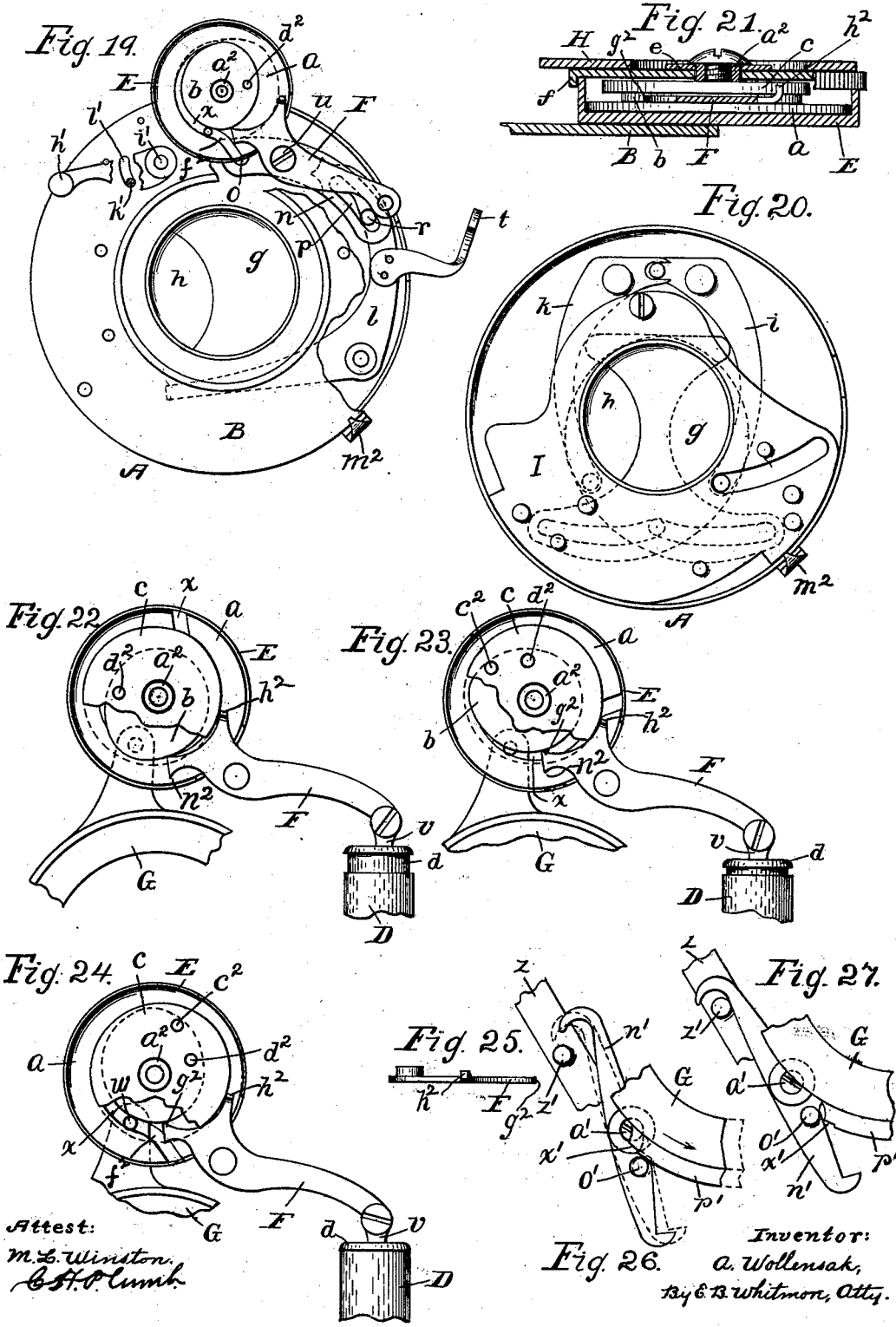

UNITED STATES PATENT OFFICE.

ANDREW WOLLENSAK, OF ROCHESTER, NEW YORK.

PHOTOGRAPHIC SHUTTER.

SPECIFICATION forming part of Letters Patent No. 691,689, dated January 21, 1902.

Application filed September 14, 1900. Serial No. 30,043. (Model.)

*To all whom it may concern:*

Be it known that I, ANDREW WOLLENSAK, of Rochester, in the county of Monroe and State of New York, have invented a new and useful Improvement in Photographic Shutters, which improvement is fully set forth in the following specification and shown in the accompanying drawings.

My invention is a photographic shutter constructed to make all kinds of exposures as to duration—that is to say, all exposures from instantaneous to time exposures of any length—the exposures beginning with instantaneous duration and increasing in time up to those of a certain prearranged length being graded.

The invention is hereinafter fully described, and more particularly pointed out in the claims.

Referring to the drawings, Figure 1 is a front view, and Fig. 2 a rear view, of the shutter. Fig. 3 is a front view of the dial and associated parts. Fig. 4 is a view of the dial with the pointer removed. Fig. 5 is a front view of parts of the device with parts omitted and broken away, showing the guard-cam, the air-valve being longitudinally sectioned. Fig. 6 is a view of the interior of the cam-case and a part of the cam-lever, showing the grade-cam. Fig. 7 is a front view of the cam-case with parts removed and some associated parts, showing the time-cam in two positions by full and dotted lines. Fig. 8 shows the interior of the cam-case and some associated parts, all the cams being omitted. Fig. 9 is a front elevation of a part of the annular cover, the cam case or holder and cam-lever being omitted. Fig. 10 is a face view of the knurled disk for turning the dial-index and the cams. Fig. 11 shows the interior parts of the device in their normal positions, the cover being being omitted. Fig. 12 is a view similar to Fig. 11, showing the parts set for an exposure. Fig. 13 shows more fully the secondary or time catch with associated parts in position for an exposure. Fig. 14 shows the parts immediately after the exposure is terminated. Fig. 15 shows the primary or bulb catch with associated parts. Fig. 16 shows the spring-controlled actuator for the operating-lever, parts appearing in two positions by full and dotted lines. Fig. 17 shows the time-catch engaging the main lever with associated parts. Fig. 18 shows more clearly the mechanism controlling the graded exposures. Fig. 19 shows the parts set for making an instantaneous exposure. Fig. 20 shows the diaphragm and the blade-carriers, all the upper parts being omitted. Fig. 21 is a diametrical section of the cam-case, taken on the dotted line 21 in Figs. 1 and 5, the cam-lever being sectioned on the dotted line 21' in Fig. 5. Figs. 22, 23, and 24 show, respectively, the positions of coacting parts for making different ones of the graded exposures. Fig. 25 is an end view of the cam-lever seen as indicated by arrow 25 in Fig. 6. Figs. 26 and 27 show the different positions of the secondary catch and the adjacent part of the controlling-ring.

Figs. 1, 2, and 4 are drawn to a scale natural size. Figs. 11, 12, and 17 to 20, inclusive, are drawn to a scale one and one-half to one. Figs. 3, 5 to 10, inclusive, 13 and 14, and 22 to 27, inclusive, are drawn to a scale two to one, and Figs. 15, 16, and 21 to a scale three to one.

My present invention relates in part to mechanism for effecting bulb and time exposures, but more particularly to mechanism for effecting a series of short-graded exposures having periods ranging from a second of time down to instantaneous, enabling the artist to make an exposure of any duration wished.

Referring to the drawings, A is the circular metallic holder or body of the device inclosing most of the working parts.

B is an annular plate constituting a cover for the open front of the body A.

C is an air-pump for bulbwork, and D an air-valve, both being secured to the cover B.

E is a circular case for holding the cams secured to the cover B to overhang the body A, the planes of the latter and the case E being parallel.

*a*, *b*, and *c*, Figs. 5 to 7 and 21 are a series of cams in the case E.

F is a cam-lever fulcrumed on a pin *u*, connected at its outer end with the valve-rod *v* of the air-valve D, having its inner end branched to be engaged by the cams *b* and *c*.

G, Figs. 1, 7, and 11, is a movable ring within and below the cover B, controlled by the cam *a* by means of a pin *w*, rigid in an extended part of the ring, the pin occupying a curved slot $x$ of the cam.

H, Figs. 1, 3, and 21, is a speed-dial over the case E, and $e$ a movable pointer for the dial.

$f$, Figs. 1, 2, and 10, is a circular plate knurled at its edge for turning the cams within the case E, and the pointer $e$ serving also to cover or close the open end or face of said case.

I, Figs. 11 to 16 and 20, is a diaphragm parallel with and dividing the space within the body A.

$g\ h$ are the closing leaves or blades, carried by coacting arms $i\ k$ beneath, which diaphragm and the leaves and carrying-arms are shown and fully described in Letters Patent No. 642,861, granted to me February 6, 1900, and need no further description here. Also $l$ and $m$, Figs. 11, 12, 18, and 19, are respectively a main lever and a trip-lever, both shown and described in said Letters Patent, being referred to therein by reference-letters $y$ and $b$.

$n$, Figs. 8, 18, and 19, is a curved slotted lever pivoted at $o$ to the cover B and adapted to swing in a plane parallel therewith. The fulcrum-pin $u$ of the cam-lever F is held by the lever $n$, extending outward through a slot $y$ in the cover B. The main lever $l$ is provided with a rigid pin $r$, in position to enter the slot $p$ in the lever $n$, by means of which said main lever directly controls the lever $n$ and indirectly the cam-lever F, the lever $n$ being intermediate the levers $l$ and F. The main lever is actuated by a spring $s$, Figs. 11 and 12, its normal position appearing in the former figure. This lever has a branch $t$ projecting from the body A, forming a finger-rest by means of which to pull the lever back to set the parts for an exposure.

An operating-lever $z$, Figs. 11 to 17, pivoted on a pin $a'$, rigid with the diaphragm I, is formed with a ledge $b'$, in position to catch and temporarily hold the adjacent end of the lever $l$, Figs. 12 and 13, when pulled back preparatory to making an exposure. This lever $z$ is actuated by a frog $b'$, Figs. 15 and 16, controlled by a spring $d'$ to hold the lever normally as appears in Fig. 13, the spring pressing a projection $r'$ of the frog. A projecting thumb-lever $e'$, Figs. 1, 13, and 14, pivoted at $f'$ to the cover B, has an extended part engaging a pin $g'$ of the lever $z$, as shown. By pressing this thumb-lever to the position shown by dotted lines in Fig. 1 the lever $z$ will be turned to the position shown in Fig. 14, thus releasing the main lever $l$ and allowing it to return to its normal position, as shown. A bulb-lever $h'$, Figs. 1 and 19, pivoted to the cover B at $i'$, has its free end over the air-pump C. This lever is provided with a pin $k'$, extending inward through a slot $l'$ in the part B and engaging the thumb-lever $e'$, as appears in Fig. 13. By means of this construction the action of the bulb also serves by indirectly turning the lever $e'$ to throw the lever $z$ to the position shown in Fig. 14 and release the lever $l$.

While the lever $l$ is moving in any case from the ledge $b'$, Fig. 13, to its normal position, Fig. 14, the blades $h\ g$ successively open and close to make an exposure in a manner fully set forth in said Letters Patent No. 642,861.

$m'$ and $n'$, Figs. 15 and 17, are respectively the primary and secondary catch-levers or catches for the lever $l$, both turning on the pin $a'$ for bulb and time work, respectively, brought into position to singly intercept and temporarily detain the lever in its return movements. The catch $n'$ has a pin $o'$, Figs. 11 and 12, in position to be engaged by a lateral projection $p'$ of the ring G to hold said catch back out of action except for time exposures. The frog $c'$ is formed with a projection $s'$, Fig. 13, which ordinarily engages a short arm $t'$ of the catch $m'$ to hold the latter back out of action or away from the end of the lever $l$ as it passes by. The catch $m'$ is also formed with a slight forward projection $u'$, Figs. 11 to 15, which at certain times is encountered by the adjacent part of the catch $n'$, serving to hold the former catch out of action. A slender spring $v'$, Figs. 13 and 14, pressing a branch $w'$ of the catch $n$, tends to hold the latter normally in position to engage the lever $l$, said catch being prevented from engaging the lever by the action of the projection $p'$, as above described, while the graded or the bulb exposures are being made.

The circular projection $p'$ of the ring G is formed with a slight indentation $x'$, Figs. 12 and 17, which when brought into position by turning the ring allows the pin $o'$ to move slightly inward, causing the catch $n'$ to assume the position shown by dotted lines in Fig. 26. This is for bulbwork, and this new position of the catch $n'$ permits the bulb-catch $m'$ to swing far enough forward to catch and temporarily hold the descending lever $l$, as shown in Fig. 15. A slender spring $y'$ pressing against the part $t'$ of the catch $m'$ tends to hold the latter normally in position for action. Ordinarily the point of this catch stands forward of the catch $n'$, on the same side of the lever $l$ or nearer the end of the lever, as shown in Fig. 11, so that when the ring G is turned to the position shown by dotted lines in Fig. 26 for bulbwork the point of the catch $m'$ is allowed to advance sufficiently to engage said lever, (see Fig. 15,) while the point of the catch $n'$ does not correspondingly move forward sufficient to engage said lever, the relative positions of the point of the catch $n'$ and the lever being shown by the dotted position of said catch in Fig. 15 or in full lines in Fig. 14. It is only when the ring G is turned sufficient to carry the projection $p'$ entirely away from in front of the pin $o'$, as shown in Figs. 17 and 27, that the catch $n'$ can swing far enough forward to engage the lever.

When the catch $m'$ is active, as in making bulb exposures, the catch $n'$ is always out of action; but when the latter catch is in position to catch the lever $l$, as for timework, the catch $m'$ always acts with it, catching the lever just in advance, but quickly releases it to descend upon the catch $n'$, which holds it during the period of a time exposure, the blades $h$ and $g$ only closing after the lever $l$ leaves said catch $n'$.

Normally the frog $c'$ stands in the position shown in Figs. 11 and 13, with the projection $s'$ engaging the part $t'$ of the catch $m'$, serving to hold the latter out of action; but when the operating-lever $z$ is pushed inward by the thumb-lever $e'$, as already described, to the position shown in Figs. 14 and 15 said part $t'$ is normally pressed by the spring $y'$ into the hollow of the frog between the projections $r'$ and $s'$. This causes the point of the catch $m'$ to move into position for action, except when making graded exposures it is held back by the catch $n'$ pressing the projection $u'$, as already described. In time and bulb work, when the lever $l$ is held by the catch $m'$, the latter is caused to move back and release the lever by the projection $s'$ of the frog pressing the part $t'$ of the catch as the frog turns to its normal position after the lever $z$ is released.

The lever $z$ is provided with a pin $z'$, which during timework controls in part the action of the catch $n'$. While making graded or bulb exposures said catch stands apart from the pin, as shown in the two positions in full and dotted lines in Fig. 26, and is not affected by the pin; but in timework, as shown in Figs. 17 and 27, the upper end of the catch is turned against the pin and is moved by the latter as the lever $z$ is turned forward and back. The controlling-spring $v'$ serves to keep the catch against the pin $z'$, and when the lever $l$ is caught by the catch $n'$, as shown in Fig. 17, a forward movement of the lever $z$ to the position shown in Fig. 14 serves to release the lever, the parts momentarily assuming the positions shown in said figure.

The cams $a\ b\ c$ are inclosed in the case E by the knurled disk $f$, projecting at its edge to be seized by the thumb and finger when setting the parts. This disk is adapted to turn upon a central axis $a^2$, rigid with the case, and is provided with a pin $b^2$, projecting into an orifice $c^2$ in the cam $c$, by means of which the latter is turned by the disk. A similar pin $d^2$, rigid in the cam $a$, projects outward through orifices in the cams $b$ and $c$, by means of which all three cams turn as a single body with the disk, including also the pointer $e$, which is controlled by means of a pin $e^2$ engaging the disk.

The speed-dial H, Fig. 3, is marked with different characters, the initials "B" "T" denoting, respectively, bulb and time. The disk and the cams are adapted to be turned to have the pointer indicate any of the characters from "1" to "T." The eight numbers on the dial, "1" to "100," inclusive, are so placed that when the pointer is successively turned to them the mechanism will be successively in positions to give a series of regularly-graded exposures as to duration from about one second of time to instantaneous.

The pin $w$, Figs. 7, 8, and 9, of the ring G reaches outward through coinciding slots $l^2$ and $k^2$ in the parts B and E, respectively, into the slot $x$ of the cam $a$. This slot $x$ is circular throughout most of its length, on account of which the turning of the cam, as already stated, does not ordinarily affect the ring, this period of rest for the ring occurring while the pointer $e$ indicates any of the positions for graded work. When, however, the disk is turned so the pointer stands at "B," the outwardly-turned part $f^2$ of the slot $x$ engages the pin $w$, as appears in Fig. 7, and causes the ring to turn slightly toward the left. This new position of the ring brings the indentation $x'$ opposite the pin $o'$ of the catch-lever $n'$ for bulbwork, as appears by dotted lines in Fig. 25. Turning the pointer onward to "T," the part $p'$ of the ring will be removed from the pin $o'$, as shown in Fig. 17, for timework.

The grade-cam $b$, Figs. 6, 19, and 22 to 24, the air-valve D, and cam-lever F together determine the duration of each of the series of graded exposures, these parts, together with the intermediate lever $n$, constituting the retarding mechanism for the exposure mechanism, which latter involves the main lever $l$. When the parts are set for an exposure, Figs. 12 and 19, the levers $n$ and F rise, and if the inner end of the latter is free to move upward the plunger $d$ will not be raised. If, however, said end of the lever be opposed, the outer end will move upward, carrying the plunger with it, and the slow descent of the plunger, on account of the air beneath it, will serve to retard the action of the exposure mechanism, and thus prolong the exposure, the length of the latter depending upon the distance the plunger is lifted.

One branch of the lever F is formed with a point $g^2$ in position to be engaged by the operating edge or face of the grade-cam $c$. This limits the distance the inner end of the lever may move upward, and consequently the distance the plunger $d$ may be drawn out and the duration of the exposure, the latter continuing until the main lever $l$ returns to its normal position, as already stated. If the cam be in position to prevent any upward motion of the adjacent end of the lever, the upward motion will take place wholly at its outer end, lifting the plunger to its maximum height and giving the longest of the graded exposures. If the cam be turned so the inner end of the lever may move a limited distance upward, the plunger will be raised a correspondingly less distance, giving a shorter exposure. Also if the upward motion of the inner end of the lever be not obstructed by the cam the plunger will not be raised, and so will not enter into the control of the exposure mechanism, the exposure being in such case instantaneous. The construction is such that when the pointer indicates "1" the cam will be in position to hold the adjacent end of the lever down, causing the plunger to be lifted for the longest of the graded exposures, and when "100" is indicated the exposure will be instantaneous. Figs. 22, 23, and 24 show the positions of the parts set for exposures when the pointer is set at "2," "25, and "100," respectively.

When the shutter is set for bulbwork or timework, the cam $b$ and levers F and $n$, Fig. 19, are inoperative, these parts being active only when graded exposures are made.

With the cams $a$ and $b$ I employ a safety or guard cam $c$, Figs. 5 and 21 to 24, adjacent to the cam $b$, to control the lever F and prevent the plunger moving by accident at any time too far out to cause an exposure of too-long duration. The branch $h^2$ of the lever F is turned up into position to be engaged by the periphery of the cam $c$, Fig. 21. This cam is given such shape and relatively so placed that its operative edge or face is always presented to the branch $h^2$ the instant the levers $n$ and F cease to move upward or the instant all parts of the latter cease to move upward, whether it be acting or not. This effectually prevents the element $d$ at any time acting differently than wished in regulating the duration of the exposure or from accidentally entering into such regulatory action when designed to be silent.

The cam $b$ is a controller for the retarding mechanism, which cam and the cams $a$ and $c$, all joined, act as a single body with three differently-formed operating-faces to serve different purposes, as described, each face acting independently of the others. The faces of the cams $b$ and $c$ act substantially as a pair in graded work, though the former begins to act before the latter, and in bulbwork and time-work the cams $a$ and $c$ act practically as a pair, the cam $b$ being out of action.

When the plunger $d$ is up, it descends against the action of the air beneath it in the body D (the air slowly escaping between the plunger and said body) on account of the pressure of the spring-actuated lever $l$. The inner end of the lever F first descends until the point $n^2$ encounters the circular wall of the case E, Figs. 5, 6, and 7, when its motion is arrested, after which the outer end of the lever and the plunger begin to descend.

With this construction of shutter the iris diaphragm $i^2$, Fig. 2, may be employed, if desired, regulated by the index $m^2$, Figs. 1 and 2, and associated scale $o^2$.

What I claim as my invention is—

1. A photographic shutter adapted to make graded exposures, having a controlling-body with separable independent differently-formed superimposed operating-faces movable as a single body and adapted to be shifted in a series of positions to control the mechanism to give any one of the exposures, with means for operating the exposure mechanism, as set forth.

2. A photographic shutter adapted to make any one of a series of regular graded exposures from brief duration to instantaneous, comprising a controlling-body having superimposed independent differently-formed operating-faces movable as a single body that can be shifted to any one of a series of positions, with means for operating the exposure mechanism, as set forth.

3. A photographic shutter adapted to make any one of a series of quick graded exposures from brief duration to instantaneous having a separable controlling part for the mechanism composed of various differently-formed superimposed operating-cam surfaces adapted to be moved as a single unit upon a common center to be shifted to different positions, one for each of the exposures of the series, with means for operating the exposure mechanism, as set forth.

4. A photographic shutter adapted to make graded exposures, consisting, in combination with the exposure mechanism, of retarding mechanism for the exposure mechanism, and a shiftable controlling-piece for the retarding mechanism embodying differently-formed superimposed cams to effect any one of the graded exposures, means for moving said cams as a single body, and means for operating the exposure mechanism, as set forth.

5. A photographic shutter adapted to make a series of quick exposures graded from brief duration to instantaneous, and bulb and time exposures, having a controlling-piece of superimposed cams adapted to be moved on a common center to any one of a series of positions for controlling the mechanism to give the graded exposures, or to either of two other positions to give bulb or time exposures, substantially as shown and described.

6. A photographic shutter adapted to make a series of exposures regularly graded as to duration, having in combination with the exposure mechanism a retarding mechanism composed of superimposed bodies having various differently-formed operating-faces, means for causing said faces to be moved as a single body and a shiftable controller for the retarding mechanism whereby any of the exposures of the series may be made, and means for operating the exposure mechanism, substantially as shown and described.

7. A photographic shutter for making graded exposures, having a holding-body and exposure mechanism therein, in combination with retarding mechanism comprising a lever, and a separable movable part with uneven operating-face to engage said lever, and constructed to form independently-acting cam-surfaces superimposed one upon the other on a common center, with means to operate the exposure mechanism, substantially as described.

8. A photographic shutter for making graded exposures, having a hollow body, and exposure mechanism therein, a controlling-body consisting of differently-formed superimposed cams moving as a unit to control said mechanism in combination with retarding mechanism comprising a lever, and a movable cam to engage said lever, with means for operating the exposure mechanism, substantially as described.

9. A photographic shutter adapted to make graded exposures, having a holding-body and exposure mechanism therein, a controlling-body consisting of differently-formed superimposed cams moving as a unit to control said mechanism in combination with a lever, and a movable cam to engage one end of the lever, and an air-valve connected with the opposite end of the lever, and means to operate the exposure mechanism, substantially as shown and described.

10. A photographic shutter adapted to make graded exposures, having a holding-body and exposure mechanism therein, in combination with a lever having branches, cams to engage the branches of the lever, and means to set the cams, and for operating the exposure mechanism, and an air-valve actuated by said lever, substantially as and for the purpose specified.

11. In combination with the exposure mechanism of a photographic shutter adapted to make graded exposures, a retarding mechanism for the exposure mechanism, and a shiftable controller for the retarding mechanism whereby the duration of the exposure may be determined, and a shiftable guard for limiting the action of the retarding mechanism, substantially as and for the purpose set forth.

12. In combination with the exposure mechanism of a photographic shutter adapted to make graded exposures, a retarding mechanism comprising a lever, for the exposure mechanism, cams adapted to move together as a unit for engaging different parts of the lever, and means for operating the exposure mechanism, substantially as shown and for the purpose set forth.

13. The main lever of the exposure mechanism of a photographic shutter adapted to make graded exposures, a cam-lever, and an intermediate lever connecting the main lever and the cam-lever, in combination with an air-valve connected with the cam-lever, and a cam for controlling the cam-lever, substantially as and for the purpose specified.

14. A photographic shutter adapted to make graded, bulb and time exposures, provided with a movable body having various differently-formed superimposed operating-faces to act as a unit on a common center for controlling the mechanism to effect the different exposures, with means to set said body and means for operating the exposure mechanism, substantially as specified.

15. A photographic shutter adapted to make graded, bulb and time exposures, having a movable body consisting of various independent differently-formed superimposed cams joined and moving as a unit on a common center for controlling the mechanism to effect the various exposures, with means to set said body and means for operating the exposure mechanism, substantially as shown and described.

16. A photographic shutter adapted to make graded, bulb and time exposures, having a movable body with various independent differently-formed superimposed operating-cams movable on a common center for controlling the mechanism to effect the different exposures, with means to set said body and means for operating the exposure mechanism, said operating-faces each acting independently, substantially as shown and described.

17. A photographic shutter adapted to make graded, time and bulb exposures, having a body adapted to take different positions for the graded exposures and other positions for the bulb and time exposures, said body having differently-formed operating-faces, two acting as a pair, in each of said positions for graded exposures for controlling the mechanism therefor while the other face remains neutral in said positions, with means to adjust said body and for operating the exposure mechanism, substantially as specified.

18. A photographic shutter adapted to make graded, bulb and time exposures, having a body adapted to take different positions for the graded exposures and other positions for the bulb and the time exposures, said body having differently-formed operating-faces, two acting as a pair, for controlling the mechanism for the graded exposures, the other, third, face being neutral, said third face acting to control successively the mechanism for the bulb and the time exposures while said pair of faces is inactive, substantially as and for the purpose specified.

19. A photographic shutter adapted to make bulb and time exposures, having a main lever and detents therefor to act successively in the same direction to catch the lever, a stop to hold the catches out of action, and a controlling-cam for the stop, with means to move the catches into action and for operating the exposure mechanism, substantially as specified.

20. A photographic shutter adapted to make exposures of different duration, having a main lever, and an operating-lever for the exposure mechanism, a pair of catches for the main lever controlled by the operating-lever, with means for controlling the operating-lever and for operating the exposure mechanism, substantially as and for the purpose set forth.

21. A photographic shutter adapted to make exposures of different durations, having a main lever, and an operating-lever for the exposure mechanism, a primary catch for the main lever, and a secondary catch for the main lever adapted to control the primary catch, the operating-lever engaging the secondary catch, with means for moving the operating-lever, substantially as and for the purpose set forth.

22. A photographic shutter adapted to make exposures of different kinds as to duration, having a main lever, a primary and a secondary catch for the main lever, an operating-lever for the exposure mechanism adapted to control the secondary catch, and an actuator for the operating-lever and the primary catch, substantially as shown and described.

23. A photographic shutter adapted to make instantaneous and longer exposures, having a main lever, a primary and secondary catch for the main lever, an operating-lever for the exposure mechanism adapted to control the secondary catch, and an actuator for the operating-lever, said actuator and the secondary catch jointly acting to control the primary catch, substantially as and for the purpose specified.

24. In a shutter of the character described, a setting device, and the rim of the aperture of the shutter constructed to serve as an axis independent of the shutter movement itself.

25. In a shutter of the character described a controlling-body composed of a plurality of separate independent superimposed cams mounted upon a common center and means for uniting the same to cause them to move in unison at predetermined periods.

In witness whereof I have hereunto set my hand, this 29th day of August, 1900, in the presence of two subscribing witnesses.

ANDREW WOLLENSAK.

Witnesses:
 ENOS B. WHITMORE,
 M. L. WINSTON.